United States Patent
Azima et al.

(10) Patent No.: US 6,320,967 B1
(45) Date of Patent: *Nov. 20, 2001

(54) PASSENGER VEHICLES INCORPORATING LOUDSPEAKERS COMPRISING PANEL-FORM ACOUSTIC RADIATING ELEMENTS

(75) Inventors: Henry Azima, Cambridge; Martin Colloms, London; Neil Harris, Great Shelford, all of (GB)

(73) Assignee: New Tranducers Limited, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 09/029,349

(22) PCT Filed: Sep. 2, 1996

(86) PCT No.: PCT/GB96/02157
§ 371 Date: Aug. 24, 1998
§ 102(e) Date: Aug. 24, 1998

(87) PCT Pub. No.: WO97/09844
PCT Pub. Date: Mar. 13, 1997

Related U.S. Application Data

(63) Continuation-in-part of application No. 08/707,012, filed on Sep. 3, 1996.

(30) Foreign Application Priority Data

| Sep. 2, 1995 | (GB) | 9517918 |
| Oct. 31, 1995 | (GB) | 9522281 |
| Mar. 30, 1996 | (GB) | 9606836 |

(51) Int. Cl.⁷ .................................................. H04R 25/00
(52) U.S. Cl. .................................................. 381/86; 381/152
(58) Field of Search ........................ 381/86, 87, 332, 381/333, 302, 152, 386, 388, 389, 151, FOR 152, FOR 151, FOR 165

(56) References Cited

U.S. PATENT DOCUMENTS

| 3,347,335 | 10/1967 | Watters et al. ........................ 181/5 |
| 4,392,027 | * 7/1983 | Bock ...................................... 381/152 |
| 4,514,599 | * 4/1985 | Yanagishima et al. ............... 381/152 |
| 5,901,231 | 5/1999 | Parrella et al. ....................... 381/86 |
| 6,188,775 | * 2/2001 | Azima et al. ......................... 381/431 |
| 6,198,831 | * 3/2001 | Azima et al. ......................... 381/338 |

FOREIGN PATENT DOCUMENTS

| 4-97700 | 3/1992 | (JP) . |
| WO 93/07729 | 4/1993 | (WO) . |

OTHER PUBLICATIONS

"Top Down Surround Sound™", Advanced Speaker Technology for Automotive Applications, OnActiveTechnologies, LLC (Fact Sheet), Feb. 23, 1996.

"Head Linings Set Up Top Down Sound", Eureka Magazine, Apr. 1996, p. 22.

Briggs, G. A., "Loudspeakers", Chapter 16, 5$^{th}$ Edition, Oct. 1958, pp. 160–168.

Azima et al., "Passenger Vehicles Incorporating Loudspeakers Comprising Panel–Form Acoustic Radiating Elements", Ser. No. 09/398,057, Filed Sep. 17, 1999, and copy of claims as presently pending.

* cited by examiner

Primary Examiner—Sinh Tran
(74) Attorney, Agent, or Firm—Foley & Lardner

(57) ABSTRACT

A vehicle having a passenger compartment (102) characterised by a loudspeaker (81) in the passenger compartment comprising a distributed mode acoustic radiator (2) and a transducer (9) mounted wholly and exclusively on the radiator to vibrate the radiator to cause it to resonate.

12 Claims, 5 Drawing Sheets

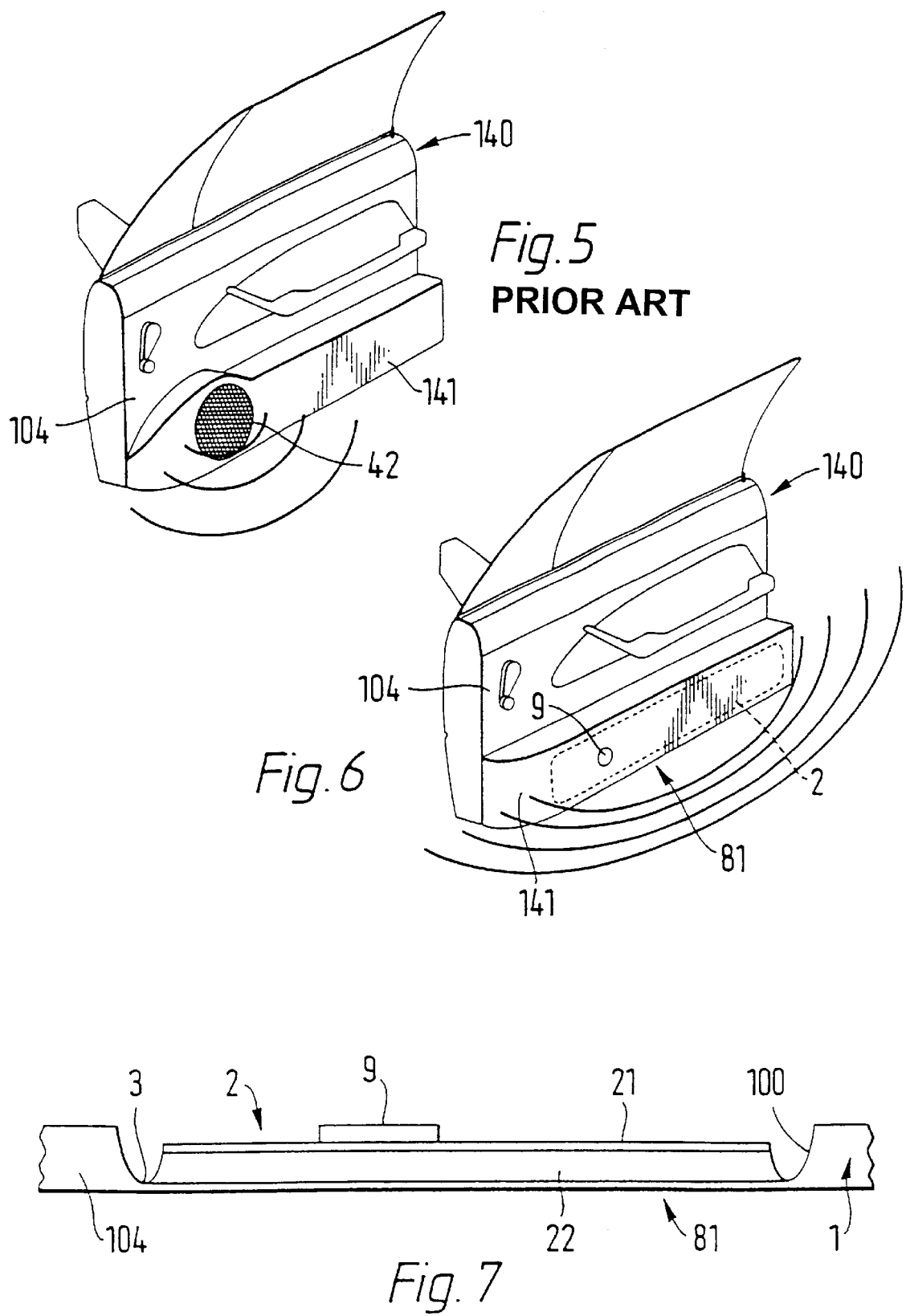

PASSENGER VEHICLES INCORPORATING LOUDSPEAKERS COMPRISING PANEL-FORM ACOUSTIC RADIATING ELEMENTS

This appln is a 371 of PCT/GB96/02157 filed Sep. 2, 1996 and a continuation-in-part of application Ser. No. 08/707,012 filed Sep. 3, 1996.

TECHNICAL FIELD

The invention relates to passenger vehicles and more particularly to passenger vehicles incorporating loudspeakers comprising panel-form acoustic radiating elements.

BACKGROUND ART

It is known from GB-A-2262861 to suggest a panel-form loudspeaker comprising:
  a resonant multi-mode radiator element being a unitary sandwich panel formed of two skins of material with a spacing core of transverse cellular construction, wherein the panel is such as to have ratio of bending stiffness (B), in all orientations, to the cube power of panel mass per unit surface area ($\mu$) of at least 10;
  a mounting means which supports the panel or attaches to it a supporting body, in a free undamped manner;
  and an electro-mechanical drive means coupled to the panel which serves to excite a multi-modal resonance in the radiator panel in response to an electrical input within a working frequency band for the loudspeaker.

U.S. Pat. No. 4,392,027 of MESSERSCHMITT discloses a loudspeaker which forms an entire interior wall or ceiling panel in an aircraft or the like. The interior wall and ceiling panels are said to be flexible.

DISCLOSURE OF INVENTION

Embodiments of the present invention use members of nature, structure and configuration achievable generally and/or specifically by implementing teachings of our co-pending application Ser. No. 08/707,012 . Such members thus have capability to sustain and propagate input vibrational energy by bending waves in operative area(s) extending transversely of thickness often but not necessarily to edges of the member(s); are configured with or without anisotropy of bending stiffness to have resonant mode vibration components distributed over said area(s) beneficially for acoustic coupling with ambient air; and have predetermined preferential locations or sites within said area for transducer means, particularly operationally active or moving part(s) thereof effective in relation to acoustic vibrational activity in said area(s) and signals, usually electrical, corresponding to acoustic content of such vibrational activity. Uses are envisaged in co-pending application Ser. No. 08/707,012 for such members as or in "passive" acoustic devices without transducer means, such as for reverberation or for acoustic filtering or for acoustically "voicing" a space or room; and as or in "active" acoustic devices with transducer means, such as in a remarkably wide range of sources of sound or loudspeakers when supplied with input signals to be converted to said sound, or in such as microphones when exposed to sound to be converted into other signals.

This invention is particularly concerned with active acoustic devices in the form of loudspeakers for use in passenger vehicles such as automobile, aircraft, boats, railway trains etc.

Members as above are herein called distributed mode acoustic radiators and are intended to be characterised as in the above copending parent application and/or otherwise as specifically provided herein.

The invention is a vehicle having a passenger compartment, and a loudspeaker in the passenger compartment, characterised in that the loudspeaker comprises a stiff lightweight member having capability to sustain and propagate input vibrational energy by bending waves in at least one operative area extending transversely of thickness to have resonant mode vibration components distributed over said at least one area and have predetermined preferential locations or sites within said area for transducer means and having a transducer mounted wholly and exclusively on said member at one of said locations or sites to vibrate the member to cause it to resonate forming an acoustic radiator which provides an acoustic output when resonating. The vehicle may be characterised by a formed component in or forming part of the passenger compartment, and in that the radiator is integral with the component. The radiator may comprise a cellular core sandwiched between skin layers, and wherein one of the skins is integral with the formed component. The said one skin may be thin in comparison to the average wall thickness of the component. The said one skin may be surrounded by a groove in the component, the groove defining a resilient surround for the radiator. The groove may be slotted to increase the compliance of the suspension. The radiator may be integral with a passenger seat in the vehicle. The radiator may be integral with the lining of a door into the passenger compartment. The radiator may be integral with the interior of the passenger compartment.

From another aspect, the invention is a vehicle component comprising a loudspeaker, characterised by a member having capability to sustain and propagate input vibrational energy by bending waves in at least one operative area extending transversely of thickness to have resonant mode vibration components distributed over said at least one area and have predetermined preferential locations or sites within said area for transducer means and having a transducer mounted on said member at one of said locations or sites to vibrate the member to cause it to resonate forming an acoustic radiator which provides an acoustic output when resonating.

BRIEF DESCRIPTION OF DRAWINGS

The invention is diagrammatically illustrated, by way of example, in the accompanying drawings, in which:

FIG. 5 is a perspective view of a prior art automobile door;

FIG. 6 is a perspective view of an automobile door according to the invention;

FIG. 7 is a partial cross-sectional view of a detail from FIG. 6;

BEST MODES FOR CARRYING OUT THE INVENTION

Figure 1:
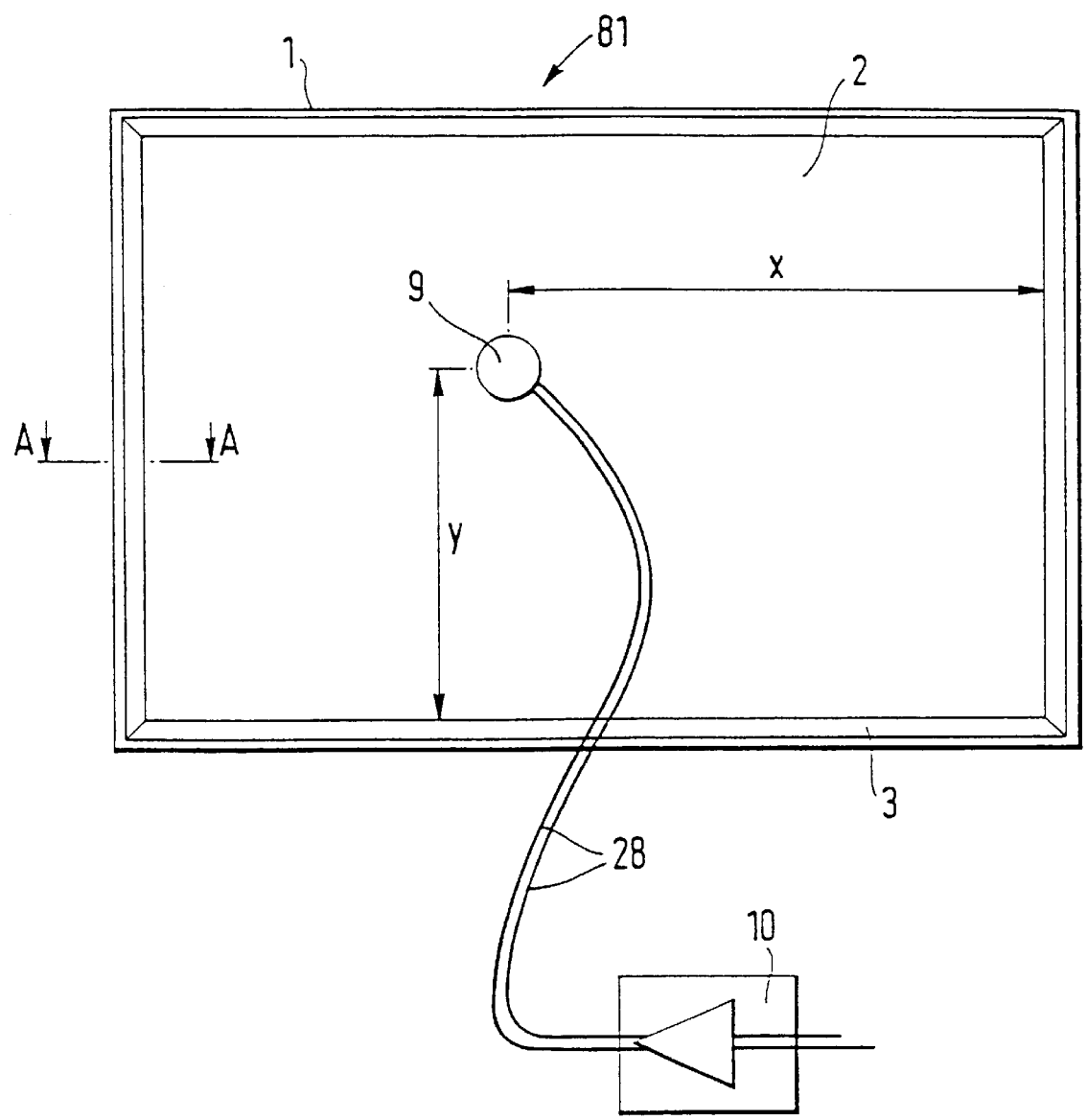
FIG. 1 is a diagram showing a distributed-mode loudspeaker as described and claimed in our co-pending application No. 08/707,012

Referring to FIG. 1 of the drawings, there is shown a panel-form loudspeaker (81) of the kind described and claimed in our co-pending application Ser. No. 08/707,012 comprising a rectangular frame (1) carrying a resilient suspension (3) round its inner periphery which supports a distributed mode sound radiating panel (2). A transducer (9) e.g as described in detail with reference to our co-pending application Ser. Nos. 09/011,773. 09/011,770, and 09/011,831 is mounted wholly and exclusively on or in the panel (2) at a predetermined location defined by dimensions x and y, the position of which location is calculated as described in our co-pending application Ser. No. 08/707,012 to launch bending waves into the panel to cause the panel to resonate to radiate an acoustic output.

The transducer (9) is driven by a signal amplifier (10), e.g. an audio amplifier, connected to the transducer by conductors (28). Amplifier loading and power requirements can be entirely normal, similar to conventional cone type speakers, sensitivity being of the order of 86–88 dB/watt under room loaded conditions. Amplifier load impedance is largely resistive at 6 ohms, power handling 20–80 watts. Where the panel core and/or skins are of metal, they may be made to act as a heat sink for the transducer to remove heat from the motor coil of the transducer and thus improve power handling.

Figure 2A:
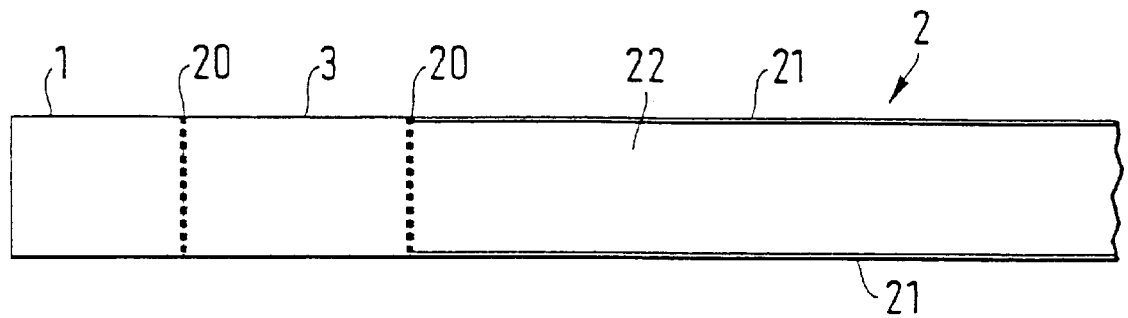
FIG. 2a is a partial section on the line A—A of FIG. 1.
Figure 2B:
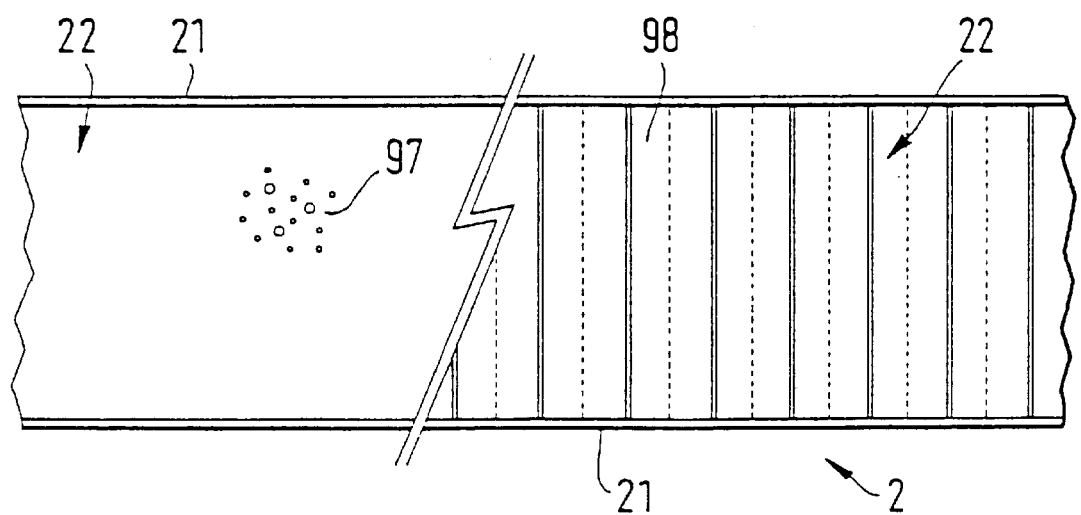
FIG. 2b is an enlarged cross-section through a distributed mode radiator of the kind shown in FIG. 2a and showing two alternative constructions.

FIGS. 2a and 2b are partial typical cross-sections through the loudspeaker (81) of FIG. 1. FIG. 2a shows that the frame (1), surround (3) and panel (2) are connected together by respective adhesive-bonded joints (20). Suitable materials for the frame include lightweight framing, e.g. picture framing of extruded metal e.g. aluminium alloy or plastics. Suitable surround materials include resilient materials such as foam rubber and foam plastics. Suitable adhesives for the joints (20) include epoxy, acrylic and cyano-acrylate etc. adhesives.

FIG. 2b illustrates, to an enlarged scale, that the panel (2) is a rigid lightweight panel having a core (22) e.g. of a rigid plastics foam (97) e.g. cross linked polyvinylchloride or a cellular matrix (98) i.e. a honeycomb matrix of metal foil, plastics or the like, with the cells extending transversely to the plane of the panel, and enclosed by opposed skins (21) e.g. of paper, card, plastics or metal foil or sheet. Where the skins are of plastics, they may be reinforced with fibres e.g. of carbon, glass, Kevlar (™) or the like in a manner known per se to increase their modulus.

Envisaged skin layer materials and reinforcements thus include carbon, glass, Kevlar (™), Nomex (™) i.e. aramid etc. fibres in various lays and weaves, as well as paper, bonded paper laminates, melamine, and various synthetic plastics films of high modulus, such as Mylar™, Kaptan (™), polycarbonate, phenolic, polyester or related plastics, and fibre reinforced plastics, etc. and metal sheet or foil. Investigation of the Vectra grade of liquid crystal polymer thermoplastics shows that they may be useful for the injection moulding of ultra thin skins or shells of smaller size, say up to around 30 cm diameter. This material self forms an orientated crystal structure in the direction of injection, a preferred orientation for the good propagation of treble energy from the driving point to the panel perimeter.

Additional such moulding for this and other thermoplastics allows for the mould tooling to carry location and registration features such as grooves or rings for the accurate location of transducer parts e.g. the motor coil, and the magnet suspension. Additionally with some weaker core materials it is calculated that it would be advantageous to increase the skin thickness locally e.g. in an area or annulus up to 150% of the transducer diameter, to reinforce that area and beneficially couple vibration energy into the panel. High frequency response will be improved with the softer foam materials by this means.

Envisaged core layer materials include fabricated honeycombs or corrugations of aluminium alloy sheet or foil, or Kevlar (™), Nomex (™), plain or bonded papers, and various synthetic plastics films, as well as expanded or foamed plastics or pulp materials, even aerogel metals if of suitably low density. Some suitable core layer materials effectively exhibit usable self-skinning in their manufacture and/or otherwise have enough inherent stiffness for use without lamination between skin layers. A high performance cellular core material is known under the trade name 'Rohacell' which may be suitable as a radiator panel and which is without skins. In practical terms, the aim is for an overall lightness and stiffness suited to a particular purpose, specifically including optimising contributions from core and skin layers and transitions between them.

Several of the preferred formulations for the panel employ metal and metal alloy skins, or alternatively a carbon fibre reinforcement. Both of these, and also designs with an alloy Aerogel or metal honeycomb core, will have substantial radio frequency screening properties which should be important in several EMC applications. Conventional panel or cone type speakers have no inherent EMC screening capability.

In addition the preferred form of piezo and electro dynamic transducers have negligible electromagnetic radiation or stray magnetic fields. Conventional speakers have a large magnetic field, up to 1 meter distant unless specific compensation counter measures are taken.

Where it is important to maintain the screening in an application, electrical connection can be made to the conductive parts of an appropriate DML panel or an electrically conductive foam or similar interface may be used for the edge mounting.

The suspension (3) may damp the edges of the panel (2) to prevent excessive edge movement of the panel. Additionally or alternatively, further damping may be applied, e.g. as patches, bonded to the panel in selected positions to damp excessive movement to distribute resonance equally over the panel. The patches may be of bitumen-based material, as commonly used in conventional loudspeaker enclosures or may be of a resilient or rigid polymeric sheet material. Some materials, notably paper and card, and some cores may be self-damping. Where desired, the damping may be increased in the construction of the panels by employing resiliently setting, rather than rigid setting adhesives.

Effective said selective damping includes specific application to the panel including its sheet material of means permanently associated therewith. Edges and corners can be particularly significant for dominant and less dispersed low frequency vibration modes of panels hereof. Edge-wise fixing of damping means can usefully lead to a panel with its said sheet material fully framed, though their corners can often be relatively free, say for desired extension to lower frequency operation. Attachment can be by adhesive or self-adhesive materials. Other forms of useful damping, particularly in terms of more subtle effects and/or mid- and higher frequencies can be by way of suitable mass or masses affixed to the sheet material at predetermined effective medial localised positions of said area.

An acoustic panel as described above is bi-directional. The sound energy from the back is not strongly phase related to that from the front. Consequently there is the benefit of overall summation of acoustic power in the room, sound energy of uniform frequency distribution, reduced reflective and standing wave effects and with the advantage of superior reproduction of the natural space and ambience in the reproduced sound recordings.

While the radiation from the acoustic panel is largely non-directional, the percentage of phase related information increases off axis. For improved focus for the phantom stereo image, placement of the speakers, like pictures, at the usual standing person height, confers the benefit of a moderate off-axis placement for the normally seated listener optimising the stereo effect. Likewise the triangular left/right geometry with respect to the listener provides a further angular component. Good stereo is thus obtainable.

There is a further advantage for a group of listeners compared with conventional speaker reproduction. The intrinsically dispersed nature of acoustic panel sound radiation gives it a sound volume which does not obey the inverse square law for distance for an equivalent point source. Because the intensity fall-off with distance is much less than predicted by inverse square law then consequently for off-centre and poorly placed listeners the intensity field for the panel speaker promotes a superior stereo effect compared to conventional speakers. This is because the off-centre placed listener does not suffer the doubled problem due to proximity to the nearer speaker; firstly the excessive increase in loudness from the nearer speaker, and then the corresponding decrease in loudness from the further loudspeaker.

There is also the advantage of a flat, lightweight panel-form speaker, visually attractive, of good sound quality and requiring only one transducer and no crossover for a full range sound from each panel diaphragm.

Figure 3:
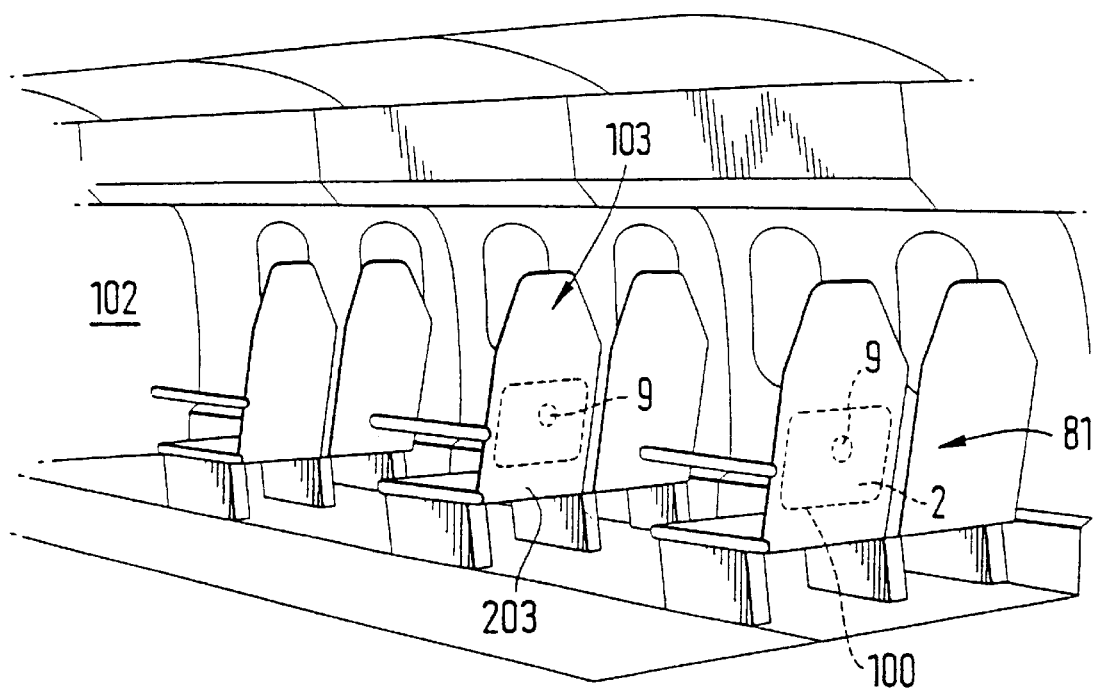
FIG. 3 is a perspective view of the passenger cabin of a vehicle.
Figure 4:
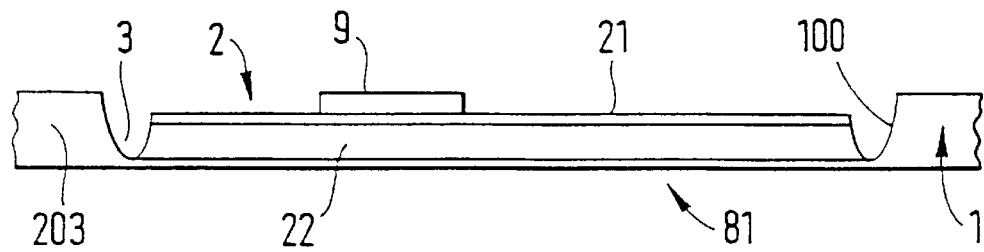
FIG. 4 is a partial cross-sectional view of a detail of FIG. 3.

In FIGS. 3 and 4 there is shown the cabin (102) of a passenger vehicle, e.g. an aircraft, railway carriage, motor coach or ferry, having rows of passenger seats (103) into the backs (203) of which are incorporated loudspeakers (81). As is conventional the seat backs (203) are shells moulded from a suitable plastics material.

As shown more particularly in FIG. 4, the moulded backs (203) of the seats (103) are moulded with generally rectangular relatively thin areas (2) bounded by grooves (100). These areas (2) are stiffened on their inner faces with a lightweight cellular core (22) which is backed by an inner skin (21) to form a rigid lightweight multi-mode radiator panel (2) of the kind described above e.g. with reference to FIGS. 1 and 2.

The grooves (100) effectively define a resilient suspension (3) and the surrounding seat backs (203) form the frame (1). A transducer (9) e.g. of the kind described in detail in our said co-pending application Ser. Nos. 09/011,773 09/011,770, and 09/011,831 is attached to each panel (2) to launch bending waves into the panels to cause them to resonate to produce an acoustic output.

FIG. 5 illustrates the conventional domestic automobile door (140) in which a conventional cone type pistonic loudspeaker drive unit (42) is mounted in a pocket (141) in a moulded or pressed door lining (104). The normal consequence of this is that the sound radiated by the drive unit (42) is directed towards the feet of the occupant(s) of the automobile, matters being made worse by the directional characteristics of conventional loudspeaker drivers.

In FIG. 6 there is shown an automobile door (140) having a door lining (104) having a pocket (141) incorporating a loudspeaker (81) according to the present invention.

As is normal, the door lining (104) is moulded or pressed from plastics or fibreboard. The lining is formed with a generally rectangular thin area (2) bounded by a groove (100). The area (2) is stiffened on its inner face with a lightweight cellular core (22) which is backed by an inner skin (21) to form a rigid lightweight multi-mode radiator panel (2) of the kind described above with reference to FIGS. 1 and 2. The groove effectively defines a resilient suspension (3) and the surrounding lining (104) forms the frame (1). The groove may be slotted as described in relation to FIG. 4.

A transducer (9) e.g. of the kind described in detail in our said co-pending application Ser. Nos. 09/011,773, 09/011,770, and 09/011,831 , is attached to the panel (2) to launch bending waves into the panel to cause it to resonate to produce an acoustic output. The wide dispersion of sound produced by a loudspeaker of the invention will provide an improved sound field for the occupants of the vehicle, with much reduced local 'hot' spots.

Figure 8:
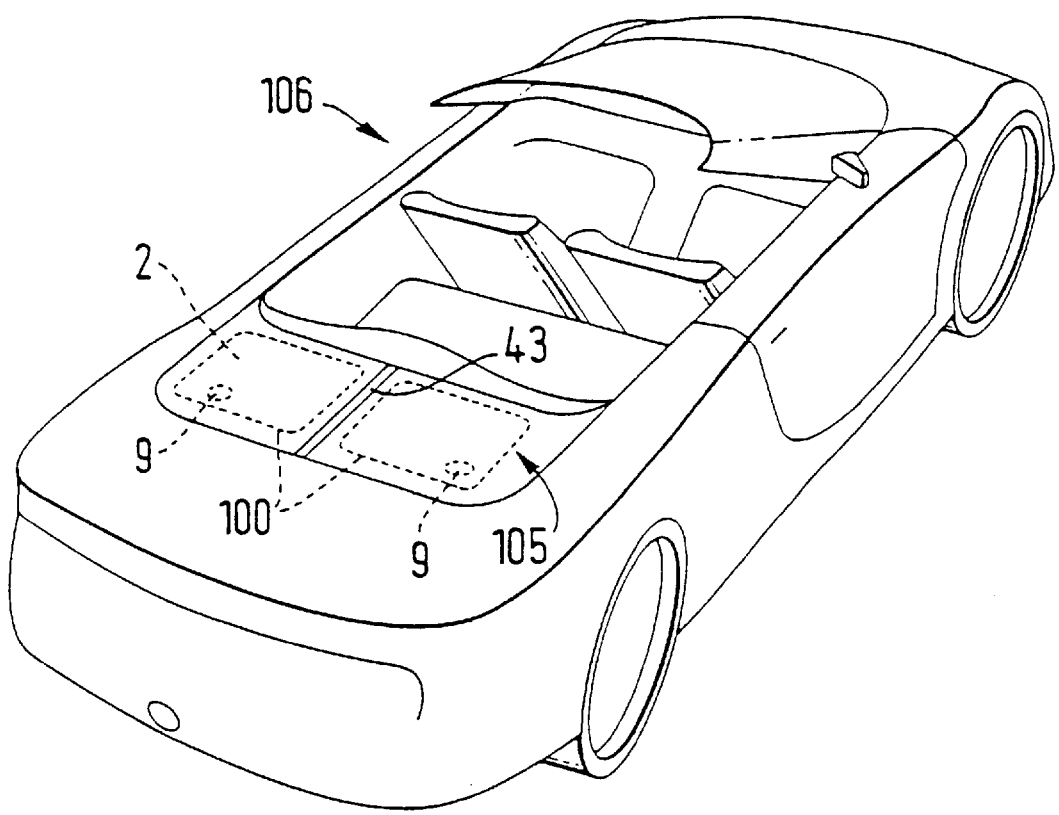
FIG. 8 is a perspective view of an automobile.
Figure 9:
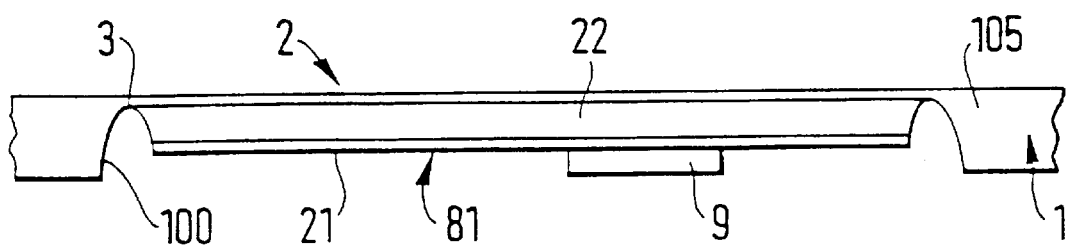
FIG. 9 is a partial cross-section view of a detail from FIG. 8.

FIG. 8 and 9 show an automobile (106) in which loudspeakers (81) are provided in a parcel shelf (105) towards the rear of the automobile. It will be noted that the parcel shelf is divided longitudinally by means of a structural rib (43) into two areas to produce a stereo pair of loudspeakers (81). Otherwise the configuration of the loudspeakers is as shown in FIGS. 6 and 7.

What is claimed is:

1. A vehicle having a passenger compartment and a loudspeaker in the passenger compartment, wherein the loudspeaker comprises:

a member having selected values of certain physical parameters which enable the member to sustain and propagate input vibrational energy in a predetermined frequency range by a plurality of resonant bending wave modes in at least one operative area extending transversely of thickness such that the frequencies of the resonant bending wave modes along at least two conceptual axes of the operative area are interleaved and spread so that there are substantially minimal clusterings and disparities of spacings of said frequencies, the member when resonating having at least one site at which the number of vibrationally active resonance anti-nodes is relatively high; and a transducer mounted wholly and exclusively on the member at one of said sites on the member, the transducer being capable of vibrating the member in the predetermined frequency range to couple to and excite the resonant bending wave modes in the member and cause the member to resonate and produce an acoustic output.

2. A vehicle according to claim 1, wherein the member is integrated with a formed component in or forming part of the passenger compartment.

3. A vehicle according to claim 2, wherein the member comprises a cellular core sandwiched between skin layers, and wherein one of the skins is integral with the formed component.

4. A vehicle according to claim 3, wherein the said one skin is surrounded by a groove in the component, the groove defining a resilient surround for the member.

5. A vehicle according to claim 3 or claim 4, wherein the said one skin is surrounded by a groove in the component, the groove defining a resilient surround for the member.

6. A vehicle according to claim 5, wherein the groove is slotted to increase the compliance of the suspension.

7. A vehicle according to claim 2, wherein the member is surrounded by a groove in the component, the groove defining a resilient surround for the member.

8. A vehicle according to claim 7, wherein the groove is slotted to increase the compliance of the suspension.

9. A vehicle according to claim 1, wherein the member is integral with a passenger seat in the vehicle.

10. A vehicle according to claim 1, wherein the member is integral with the lining of a door into the passenger compartment.

11. A vehicle according to claim 1, wherein the member is integral with the interior of the passenger compartment.

12. A vehicle component comprising a loudspeaker, wherein the loudspeaker comprises:

a member having selected values of certain physical parameters which enable the member to sustain and propagate input vibrational energy in a predetermined frequency range by a plurality of resonant bending wave modes in at least one operative area extending transversely of thickness such that the frequencies of the resonant bending wave modes along at least two conceptual axes of the operative area are interleaved and spread so that there are substantially minimal clusterings and disparities of spacings of said frequencies, the member when resonating having at least one site at which the number of vibrationally active resonance anti-nodes is relatively high; and a transducer mounted wholly and exclusively on the member at one of said sites on the member, the transducer being capable of vibrating the member in the predetermined frequency range to couple to and excite the resonant bending wave modes in the member and cause the member to resonate and produce an acoustic output.

* * * * *